(12) United States Patent
Hayashi et al.

(10) Patent No.: US 6,372,359 B1
(45) Date of Patent: Apr. 16, 2002

(54) MULTILAYERED FILM

(75) Inventors: Nahoto Hayashi; Hiroyuki Shimo, both of Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/406,774

(22) Filed: Sep. 28, 1999

(30) Foreign Application Priority Data

Sep. 28, 1998 (JP) .......................................... 10-272683
Mar. 5, 1999 (JP) .......................................... 11-058245

(51) Int. Cl.$^7$ .............................................. B32B 27/08
(52) U.S. Cl. ......................... 428/518; 428/515; 428/516
(58) Field of Search ................................ 428/515, 516, 428/518

(56) References Cited

U.S. PATENT DOCUMENTS

| 4,349,644 A | | 9/1982 | Iwanami et al. ............... 525/57 |
| 4,561,920 A | * | 12/1985 | Foster ................... 156/244.11 |
| 4,590,131 A | * | 5/1986 | Yazaki et al. ................ 428/516 |
| 4,880,706 A | * | 11/1989 | Mazuera et al. ............ 428/516 |
| 5,529,834 A | * | 6/1996 | Tsai et al. ................... 428/215 |

FOREIGN PATENT DOCUMENTS

| EP | 0504808 | 3/1992 |
| EP | 0545312 | 11/1992 |
| EP | 0 832 928 | 4/1998 |
| JP | 63-230757 | 9/1988 |
| JP | 63-264656 | 11/1988 |
| JP | 2-261847 | 10/1990 |
| JP | 8-311276 | 11/1996 |

OTHER PUBLICATIONS

Derwent Publications, AN 1988–351322, JP 63 264656, Nov. 1, 1988.
Derwent Publications, AN 1985–042231, JP 60 002361, Jan. 8, 1985.
Derwent Publications, AN 1977–71506Y, JP 52 101182, Aug. 24, 1977.
Derwent Publications, AN 1991–183075, JP 03 112654, May 14, 1991.

* cited by examiner

*Primary Examiner*—Blaine Copenheaver
*Assistant Examiner*—Leanna Roché
(74) *Attorney, Agent, or Firm*—Oblon, Spivak, McClelland, Maier & Neustadt, P.C.

(57) ABSTRACT

The multilayered film of the present invention is formed by stretching a multilayered structure to 7 to 12 times larger at least in one direction. The multilayered structure is formed by laminating a resin composition (A) layer and a polypropylene (C) layer via an adhesive resin (B) layer. The resin composition (A) comprises two ethylene-vinyl alcohol copolymers (a1) and (a2) having different melting points and satisfies the following formulae (1) to (3):

$$150 \leq MP(a1) \leq 172 \qquad (1)$$

$$162 \leq MP(a2) \leq 180 \qquad (2)$$

$$4 \leq \{MP(a2) - MP(a1)\} \leq 30 \qquad (3)$$

where MP(a1) represents the melting point (° C.) of the ethylene-vinyl alcohol copolymer (a1) measured by a differential scanning calorimeter (DSC), and MP (a2) represents the melting point (° C.) of the ethylene-vinyl alcohol copolymer (a2) measured by a differential scanning calorimeter (DSC).

17 Claims, 3 Drawing Sheets

MULTILAYERED FILM

BACKGROUND OF THE INVENTION

1. Field of the Invention

The present invention relates to a stretched multilayered film with excellent gas barrier properties that is formed by laminating a resin composition layer comprising an ethylene-vinyl alcohol copolymer (hereinafter referred to as "EVOH") and a polypropylene layer via an adhesive resin layer to form a multilayered structure and stretching the multilayered structure in a high stretch ratio at least in one direction.

2. Description of the Prior Art

EVOH films have excellent transparency, barrier properties to oxygen, carbon dioxide, and nitrogen, and oil resistance. With such characteristics, the EVOH films are used as a packaging material for food, pharmaceutical products or the like. However, the EVOH films are moisture-sensitive and the barrier properties thereof deteriorate under high humidity. In addition, the EVOH films disadvantageously have a poor impact strength. In order to compensate for these shortcomings, an EVOH is used in the form of a laminate comprising an EVOH and polyolefin, which has excellent moisture-proof properties and impact properties, such as polypropylene.

However, the following problem is caused in the production of a film by laminating an EVOH and a polypropylene resin: Molding processes such as stretching can be performed easily for the polypropylene resin, whereas the EVOH has poor stretchability.

In the production of a film by laminating polyolefin and an EVOH, great ingenuity has been exerted to impart sufficient stretchability to the EVOH. For example, U.S. Pat. No. 4,561,920 (Japanese Laid-Open Patent Publication No. 60-187538) describes using an EVOH having a melt flow rate (hereinafter, referred to as "MFR") of at least about 8 g/10 minutes, rapidly cooling a multilayered sheet comprising the EVOH so that the crystallinity of the EVOH is not more than about 25%, and then stretching the multilayered sheet.

Furthermore, another example of a multilayered barrier film comprising an EVOH is described in U.S. Pat. No. 4,880,706 (Japan Patent No. 2,679,823). This patent publication discloses a multilayered film obtained by the following method. First, a multilayered sheet having a structure of a polypropylene layer/an adhesive layer/an EVOH layer/an adhesive layer/a polypropylene layer is formed and immediately cooled rapidly to about 50° C. Then, the thus-obtained sheet is preheated in the range from 135 to 150° C. and stretched to 4 to 7 times larger in the longitudinal direction. Then, the sheet is preheated in the range from 170 to 180° C. and stretched in the transverse direction in the range from 155 to 165° C. Furthermore, this patent publication describes that it is preferable to use an EVOH having an ethylene content of at least 45 mol %, a degree of hydrolysis of at least 99%, and an MFR of 14 to 18 g/10 minutes at 190° C. and a load of 2,160 g in order to be provided with stretchability. In addition, the publication states that it is preferable to use a polypropylene having an MFR of 2 to 6 g/10 minutes as the polyolefin that is laminated to the EVOH.

In stretching the multilayered sheet comprising the polypropylene and the EVOH as described above, it is preferable to allow the EVOH to have sufficient stretchability; namely, it is preferable that the EVOH has a high ethylene content. However, it is well known that the lower the ethylene content is, the better the gas barrier properties of the EVOH are, except when it is under extremely high humidity conditions such as 100% RH. Therefore, the gas barrier properties have been sacrificed for sufficient stretchability in a stretching process, in which an EVOH having an ethylene content of 45 mol % or more must be used.

On the other hand, Japanese Laid-Open Patent Publication No. 8-311276 discloses a multilayered film comprising an EVOH resin composition exhibiting a specific melting curve measured by a differential scanning calorimeter (DSC). Although the publication describes that this multilayered film can be stretched to 24 to 50 times greater, it actually was stretched to only 24 times greater. Thus, this publication fails to disclose a film that is stretched in a high stretch ratio and has a high modulus of elasticity at a high temperature. Furthermore, since the saponification degree of the EVOH used is relatively low, the EVOH is susceptible to heat deterioration when the production of the film is performed continuously over a long period.

Generally, a stretching operation in the transverse direction adapted for a multilayered sheet comprising a polypropylene layer is performed in the temperature range from a temperature in the vicinity of 150° C. to a temperature in the vicinity of the melting point of the polypropylene, so that the stretched polypropylene film can exhibit sufficient mechanical properties. Therefore, in order to stretch the laminated sheet of the EVOH and polypropylene in a high stretch ratio, it is preferable that the temperature range in which the EVOH can be stretched is in the stretching temperature range for the polypropylene sheet, especially in the stretching temperature range in the transverse direction.

On the other hand, as the ethylene content of the EVOH is smaller, namely, as the melting point is higher, the EVOH can exhibit sufficient barrier properties, which is the largest characteristic of the EVOH. However, in the case where the melting point of the EVOH is excessively high, the laminated sheet comprising the EVOH and polypropylene cannot have sufficient stretchability, so that a satisfactory film cannot be obtained.

SUMMARY OF THE INVENTION

Therefore, the object of the present invention is to provide a multilayered film comprising an EVOH and a thermoplastic resin such as polypropylene that has a high stretch ratio, excellent gas barrier properties and a high modulus of elasticity even in a high temperature.

The present invention was accomplished by the inventors of the present invention, who made the research for an EVOH that has good barrier properties and can be stretched in a high stretch ratio when laminated to polypropylene, and found a suitable EVOH composition. Hereinafter, the present invention will be described more specifically.

A multilayered film of the present invention is formed by stretching a multilayered structure to 7 to 12 times larger at least in one direction. The multilayered structure is formed by laminating a resin composition (A) layer and a polypropylene (C) layer via an adhesive resin (B) layer. The resin composition (A) comprises two EVOHs (a1 and a2) having different melting points and satisfies the following formulae (1) to (3):

$$150 \leq MP(a1) \leq 172 \tag{1}$$

$$162 \leq MP(a2) \leq 180 \tag{2}$$

$$4 \leq \{MP(a2) - MP(a1)\} \leq 30 \tag{3}$$

where MP (a1) represents the melting point (° C.) of the EVOH (a1) measured by a differential scanning calorimeter (DSC), and MP(a2) represents the melting point (° C.) of the EVOH (a2) measured by DSC.

In one preferable embodiment of the present invention, the ratio of the thickness of the resin composition (A) layer to the total thickness of the multilayered film is 3 to 30%, the ratio of the thickness of the adhesive resin (B) layer to the total thickness of the multilayered film is 1 to 30%, the ratio of the thickness of the polypropylene (C) layer to the total thickness of the multilayered film is 40 to 96%, and the dynamic modulus of elasticity (E') of the multilayered film at 170° C. in dynamic viscoelasticity measurement (under a load of 11 Hz sine wave) is $3 \times 10^7$ dyn/cm$^2$ or more.

In another preferable embodiment of the present invention, the resin composition (A) has an average ethylene content of 38 to 45 mol % and an average saponification degree of 99% or more.

In still another preferable embodiment of the present invention, the resin composition (A) comprises three EVOHs (a1, a2 and a3) having different melting points and satisfies the following formulae (4) to (6):

$$MP(a1) < MP(a3) < MP(a2) \quad (4)$$

$$3 \leq \{MP(a3) - MP(a1)\} \leq 20 \quad (5)$$

$$3 \leq \{MP(a2) - MP(a3)\} \leq 20 \quad (6)$$

where MP(a1) represents the melting point (° C.) of the EVOH (a1) measured by DSC, MP(a2) represents the melting point (° C.) of the EVOH (a2) measured by DSC, and MP (a3) represents the melting point (° C.) of the EVOH (a3) measured by DSC.

In yet another preferable embodiment of the present invention, the adhesive resin (B) is polypropylene modified with carboxylic acid.

In another preferable embodiment of the present invention, the total thickness of the multilayered film is 10 to 100 µm, and the thickness of the resin composition (A) layer is 1 to 10 µm.

In still another preferable embodiment of the present invention, the multilayered film is formed by stretching the multilayered structure at 140 to 200° C.

In yet another preferable embodiment of the present invention, the multilayered film is formed by co-extruding the resin composition (A) layer, the polypropylene (C) layer and the adhesive resin (B) layer simultaneously to form a multilayered structure, and biaxially stretching the multilayered structure to 4 to 7 times larger in the longitudinal direction and 7 to 12 times larger in the transverse direction.

In another preferable embodiment of the present invention, the multilayered film is formed by extrusion-coating the resin composition (A) layer on the polypropylene (C) layer that has been stretched to 4 to 7 times larger in the longitudinal direction to form a multilayered structure, and biaxially stretching the multilayered structure to 7 to 12 times larger in the transverse direction.

According to another aspect of the present invention, a multilayered film is formed by stretching a multilayered structure to 7 to 12 times larger at least in one direction. The multilayered structure is formed by laminating a resin composition (A) layer and a polypropylene (C) layer via an adhesive resin (B) layer. The resin composition (A) comprises of an EVOH and satisfies the following formulae (7) to (9):

$$115 \leq MS \leq 140 \quad (7)$$

$$180 \leq ME \leq 195 \quad (8)$$

$$52 \leq (ME - MS) \leq 80 \quad (9)$$

where MS represents the melting start temperature (° C.) of the resin composition (A) measured by DSC, and ME represents the melting end temperature (° C.) of the resin composition (A) measured by DSC.

These and other advantages of the present invention will become apparent to those skilled in the art upon reading and understanding the following detailed description with reference to the accompanying figures.

DESCRIPTION OF THE PREFERRED EMBODIMENTS

Figure 1:
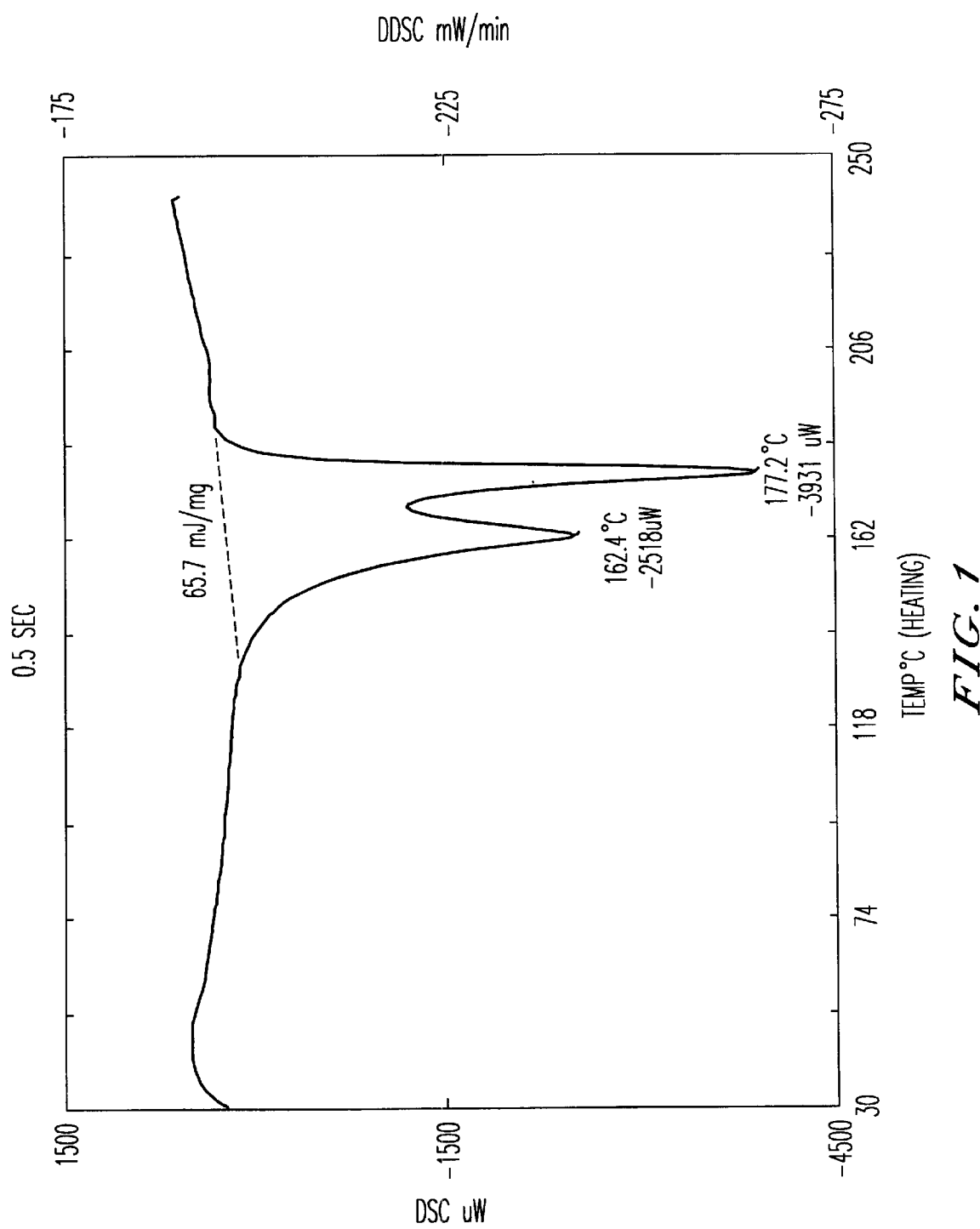
FIG. 1 is a DSC curve of a resin composition (A) used in Example 2 of the present invention.
Figure 2:
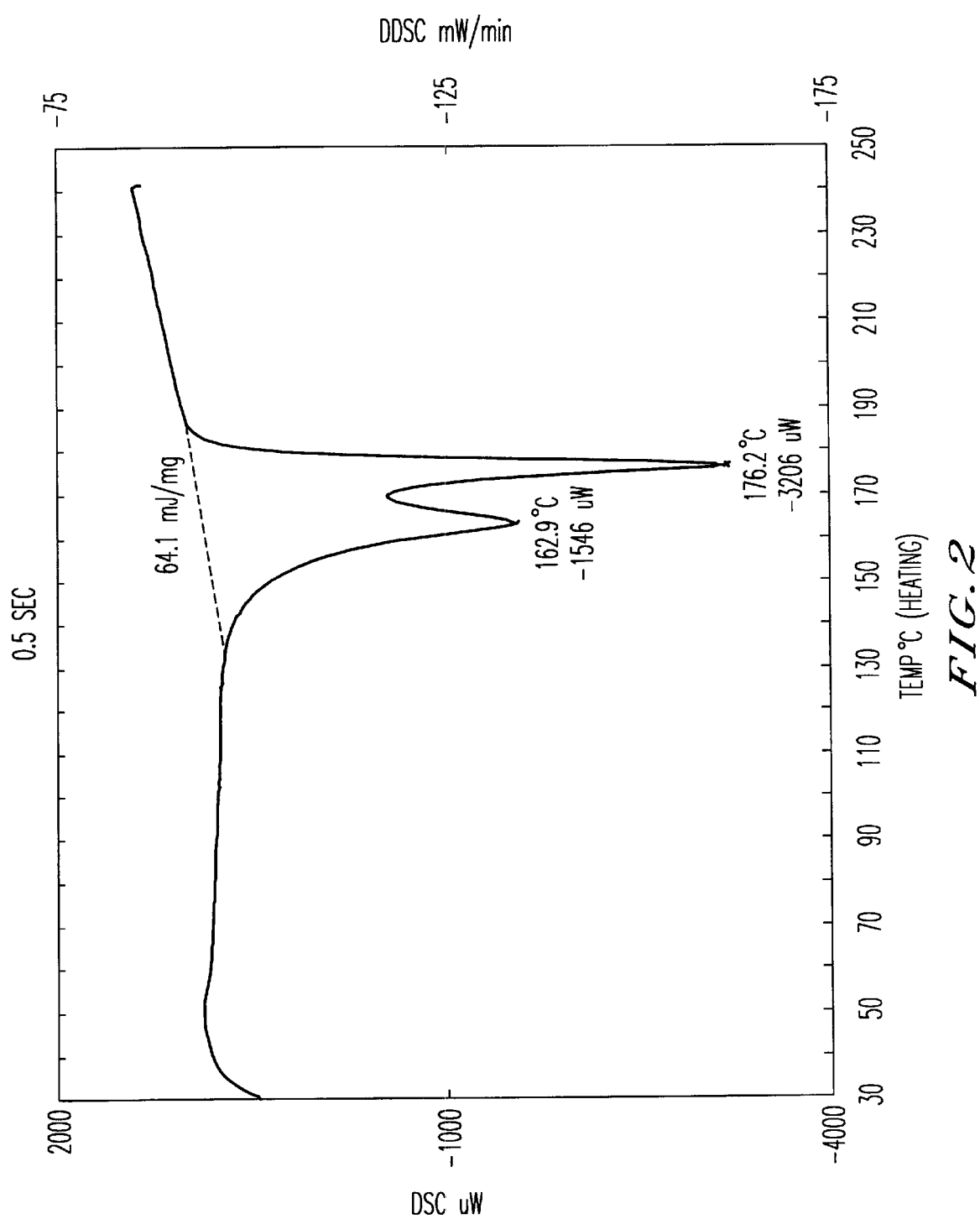
FIG. 2 is a DSC curve of a resin composition (A) used in Example 3 of the present invention.
Figure 3:
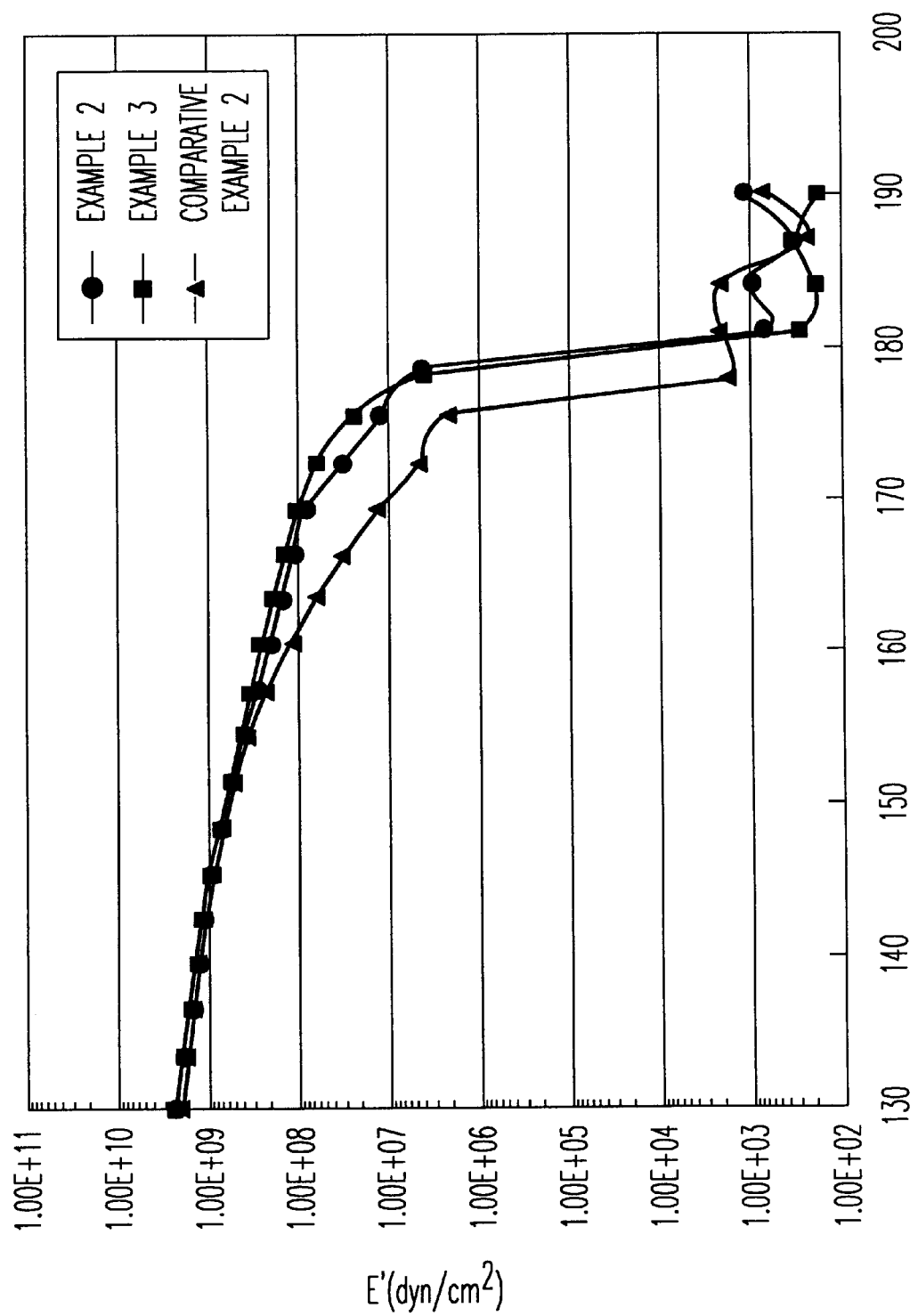
FIG. 3 is a graph where the dynamic moduli of elasticity of the multilayered films of Examples 2 and 3 and Comparative Example 2 of the present invention are plotted with respect to the measurement temperatures.

The resin composition (A) used in the present invention comprises two EVOHs (a1) and (a2) having different melting points, and satisfies the following formulae (1) to (3):

$$150 \leq MP(a1) \leq 172 \quad (1)$$

$$162 \leq MP(a2) \leq 180 \quad (2)$$

$$4 \leq \{MP(a2) - MP(a1)\} \leq 30 \quad (3)$$

where MP(a1) represents the melting point (° C.) of an ethylene-vinyl alcohol copolymer (a1) measured by DSC, and MP (a2) represents the melting point (° C.) of an ethylene-vinyl alcohol copolymer (a2) measured by DSC.

When MP(a1) is less than about 150° C., the barrier properties of the multilayered film obtained by stretching a sheet comprising such a resin composition are not sufficient to meet requirements.

On the other hand, when MP(a1) exceeds about 172° C., the stretchability of such a resin composition is not sufficient, so that stretching in a high stretch ratio as required cannot be accomplished. It is preferable that MP(a1) satisfies the following formula (1'):

$$155 \leq MP(a1) \leq 170 \quad (1')$$

Furthermore, when MP(a2) is less than about 162° C., the barrier properties of the multilayered film obtained by stretching a sheet comprising such a resin composition are not sufficient to meet requirements. On the other hand, when MP(a2) exceeds about 180° C., the stretchability of such a resin composition is not sufficient, so that stretching in a high stretch ratio as required cannot be accomplished. It is preferable that MP(a2) satisfies the following formula (2'):

$$165 \leq MP(a2) \leq 180 \quad (2')$$

Furthermore, when {MP(a2) − MP(a1)} is less than about 4° C., both of the stretchability and the barrier properties cannot be sufficient. On the other hand, when it exceeds about 30° C., the transparency of the obtained multilayered film after stretching is poor. Therefore, it is preferable that {MP(a2) − MP(a1)} satisfies the following formula (3'):

$$7 \leq \{MP(a2) - MP(a1)\} \leq 20 \quad (3')$$

The melting point in the present invention refers to a value measured in the following manner; According to a method described in the Japanese Industrial Standard (JIS), a sample is heated to a temperature of 200° C., then cooled to a temperature about 50° C. lower than the glass transition point at a cooling rate of 30° C./minute, and then heated again at a temperature increase rate of 10° C./minute (second run). The melting point is a value measured in the second run.

The contents of the two EVOHs (a1) and (a2) in the resin composition (A) are not limited to particular values, but each of the contents is preferably about 10 to 90 wt %, more preferably about 20 to 80 wt %, and even more preferably about 30 to 70 wt %.

A preferable ethylene content of the EVOH (a1) is about 38 to 55 mol %, and more preferably is about 42 to 50 mol %. A preferable ethylene content of the EVOH (a2) is about 34 to 47 mol %, and more preferably is about 36 to 45 mol %. The difference in the ethylene content between the EVOH (a1) and the EVOH (a2) is preferably about 3 to 30 mol %, and more preferably about 3 to 15 mol %. The average ethylene content in the resin composition (A) as a whole is preferably about 38 to 45 mol %, and more preferably about 40 to 44 mol %.

The saponification degrees of the EVOH (a1) and the EVOH (a2) are not limited to particular values, but preferably are about 90% or more for each of the EVOHs, more preferably about 95 mol % or more, and even more preferably about 99% or more.

The saponification degree of the resin composition (A) as a whole is preferably about 90% or more, more preferably about 95% or more, and even more preferably about 99% or more. The saponification degrees in such a range are preferable to maintain the barrier properties of the multilayered film and ensure the thermal stability of the multilayered film, especially the thermal stability after continuous operation for a long period.

There are several illustrative methods for adjusting the melting point of the EVOH. One example thereof is to adjust the ethylene content in the EVOH. Furthermore, the melting point can be changed by adjusting the saponification degree without changing the ethylene content. The ethylene content and the saponification degree of the EVOH can be obtained by the nuclear magnetic resonance (NMR) method.

Furthermore, the melting point of the EVOH can be controlled by adding a crosslinking agent so as to cause crosslinking. Examples of such a crosslinking agent include trimethoxyaluminum, triethoxyaluminum or the like, to which the present invention is not limited. Furthermore, the melting point can be adjusted by adding a plasticizer to the EVOH. Examples of such a plasticizer include glycerin, glycerin monostearate or the like.

Optionally, another EVOH as a third component can be added, as long as the two EVOHs as described above are contained, and the stretchability and the barrier properties of the multilayered film are not impaired. Above all, in addition to the EVOH (a1) and EVOH (a2), it is particularly preferable to blend an EVOH (a3) having an intermediate melting point in such a manner that the following formulae (4) to (6) are satisfied, for the purpose for obtaining high stretchability, good gas barrier properties, and good transparency:

$$MP(a1) < MP(a3) < MP(a2) \quad (4)$$

$$3 \leq \{MP(a3) - MP(a1)\} \leq 20 \quad (5)$$

$$3 \leq \{MP(a2) - MP(a3)\} \leq 20 \quad (6)$$

where MP (a1) represents the melting point (° C.) of the EVOH (a1) measured by DSC, MP(a2) represents the melting point (° C.) of the EVOH (a2) measured by DSC, and MP (a3) represents the melting point (° C.) of the EVOH (a3) measured by DSC.

When {MP (a3)–MP (a1)} or {MP (a2)–MP (a3)} is less than about 3° C. or exceeds about 20° C., the transparency of the obtained film cannot be improved. More preferably, {MP(a3)–MP(a1)} and {MP(a2)–MP (a3)} are from about 5 to 12° C.

The ethylene contents of the EVOH (a1) and EVOH (a2) are similar to those in the case where the two EVOHs are blended as described above. However, the ethylene content of the EVOH (a3) is preferably at least about 3 mol %, more preferably at least about 5 mol % higher than the ethylene content of the EVOH (a1). Furthermore, the ethylene content of the EVOH (a3) is preferably at least about 3 mol %, more preferably at least about 5 mol % lower than the ethylene content of the EVOH (a2).

The amounts of the EVOHs blended are not limited to particular values, but the amount of the EVOH(a3) blended that has an intermediate melting point is preferably about 50 to 3 wt %, more preferably about 30 to 5 wt %, even more preferably about 20 to 7 wt %. It is preferable that the amount of the EVOH (a3) blended is smaller than either of the amounts of the EVOH (a1) and EVOH (a2) blended, so that the characteristics of the EVOH (a1), which contribute to the stretchability, and the characteristics of the EVOH (a2), which contribute to the barrier properties, can be exhibited sufficiently.

Thus, the resin composition (A) used in the present invention can be prepared easily by selecting and combining two or more EVOHs having different melting points. Thus, a film having excellent stretchability and gas barrier properties can be obtained even in the form of a laminate comprising the resin composition and polypropylene. Therefore, the present invention has the advantage of easily providing a film having excellent stretchability and gas barrier properties.

The EVOH used in the present invention has the feature that at least two EVOHs are blended. This feature can be distinguished from a regular EVOH having a single composition by thermal analysis, especially DSC analysis. In the case where the melting point is different to a great extent between two or more EVOHs blended, two or more peaks can be observed in the DSC analysis. In the case where EVOHs having near melting points are blended, the peak may be apparently single. On the other hand, when the difference in the melting points is a certain value or more, the shape of the peaks becomes broad. Even in the case of the single peak, two or more peaks or shoulder peaks together with a primary peak may be observed by lowering the rate of the raising of the temperature in the DSC analysis. The resin composition (A) used in the present invention can be represented by these characteristics of the DSC curve as well.

The resin composition (A) used in the present invention may comprise two EVOHs and satisfy the following formulae (7) to (9):

$$115 \leq MS \leq 140 \quad (7)$$

$$180 \leq ME \leq 195 \quad (8)$$

$$52 \leq (ME - MS) \leq 80 \quad (9)$$

where MS represents the melting start temperature (° C.) of the resin composition (A) measured by DSC, and ME represents the melting end temperature (° C.) of the resin composition (A) measured by DSC. Such a resin composition may comprise one EVOH or two or more EVOHs.

The melting start temperature and the melting end temperature are a melting start temperature and a melting end temperature in the melting peak in the second run when the DSC measurement is performed at a temperature increase rate of 10° C./minute in a temperature range from 30 to 250° C. The melting start temperature refers to a temperature at which the DSC curve leaves the line obtained by extending a base line to the high temperature side. In this case, the base line is a line connecting the melting curve in the vicinity of 95° C. and the melting curve in the vicinity of 115° C. The melting end temperature refers to a temperature at which the DSC curve leaves the line obtained by extending a base line to the low temperature side. In this case, the base line is a line connecting the melting curve in the vicinity of 195° C. and the melting curve in the vicinity of 215° C. More specifically, the temperature at which the DSC curve leaves the base line refers to a temperature corresponding to a point that is away by $\frac{1}{100}$ of the height of the largest peak in the DSC measurement.

In the case where two EVOHs are contained, the melting start temperature and the melting end temperature can be adjusted by changing the composition ratio thereof.

When MS is less than about 115° C., the barrier properties of the film after stretching are not sufficient to meet requirements. On the other hand, when MS exceeds 140° C., stretchability is not sufficiently exhibited. It is preferable that MS satisfies the following formula (7'):

$$125 \leq MS\ 138 \qquad (7')$$

Furthermore, when ME is less than about 1 80° C., the barrier properties of such a resin composition are not sufficient to meet requirements. On the other hand, when ME exceeds about 195° C., the resin composition cannot be stretched in a high stretch ratio. It is preferably that ME satisfies the following formula (8'):

$$182 \leq ME \leq 192 \qquad (8')$$

Furthermore, when (ME−MS) is less than about 52° C., sufficient barrier properties or stretchability cannot be exhibited. On the other hand, when it exceeds about 80° C., the transparency of the multilayered film obtained by stretching such a resin composition in a high stretch ratio is poor. Therefore, it is preferable that (ME−MS) satisfies the following formula (9'):

$$52 \leq (ME-MS) \leq 70 \qquad (9')$$

The EVOH used in the present invention may be a copolymer with a small amount of polyolefin, as long as the performance of the resin composition (A) is not impaired. Examples of the monomer that can be copolymerized with the EVOH include α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, the salts thereof, the partial or complete esters thereof, the nitrites thereof, the amides thereof, and the anhydrates thereof; vinyl silane compounds such as vinyltrimethoxysilane; unsaturated sulfonic acid or the salts thereof; alkylthiols; vinylpyrrolidones; or the like.

Above all, when the EVOH contains 0.0002 to 0.2 mol % of a vinylsilane compound as a copolymer component, the dispersibility of the EVOHs is improved when they are blended, and it is also effective for improving the moldability of the resin composition (A). In addition, the melt viscosity match between the resin composition (A) and a substrate resin is improved in co-extrusion so that a uniform co-extruded multilayered film can be produced. Examples of the vinylsilane compound include vinyltrimethoxysilane, vinyltriethoxysilane, vinyltri(β-methoxy-ethoxy)silane and γ-methacryloxypropylmethoxysilane, among which vinyltrimethoxysilane and vinyltriethoxysilane are preferably used.

The MFR (at 210° C. under a load of 2160 g according to JIS K7210) of the EVOH (a1, a2 or a3) used in the present invention is preferably about 0.1 to 100 g/10 minutes, and more preferably about 0.5 to 50 g/10 minutes. The MFR of the resin composition (A) is preferably in the same range as above.

Furthermore, when the resin composition (A) used in the present invention contains a boron compound, the dispersibility of the EVOH in the preparation of the resin composition (A) is improved. Moreover, the melt viscosity of the resin composition (A) is improved so that a uniform co-extruded multilayered film can be produced. Thus, it is effective when the resin composition (A) contains a boron compound. Examples of the boron compound include boric acids, boric esters, boric salts, boron hydrides, or the like. More specifically, examples of the boric acids include orthoboric acid, metaboric acid, and tetraboric acid. Examples of the boric esters include triethyl borate and trimethyl borate, and examples of the boric salts include alkali metal salts and alkaline earth metal salts of various boric acids as listed above, and borax. Among these compounds, orthoboric acid and $NaBH_4$ are preferable.

The content of the boron compound is preferably about 20 to 2000 ppm on the basis of the boron element, and more preferably about 50 to 1000 ppm. This range allows for an EVOH with reduced torque nonuniformity in a heating and melting process. A content of less than about 20 ppm hardly provides such an effect, and a content of more than about 2000 ppm may lead to gel formation, resulting in poor moldability in some cases.

Furthermore, it is preferable to incorporate an alkali metal salt, in an amount of about 5 to 5000 ppm on the basis of the alkali metal element, into the resin composition (A) used in the present invention, because it is effective in improving the interlayer adhesion and the compatibility.

A more preferable content of the alkali metal salt is about 20 to 1000 ppm on the basis of the alkali metal element, and even more preferably about 30 to 500 ppm. Examples of the alkali metals include lithium, sodium and potassium. Preferable examples of the alkali metal salts include aliphatic carboxylic acid salts, aromatic carboxylic acid salts, phosphates, metal complex of univalent metals or the like, such as sodium acetate, potassium acetate, sodium phosphate, lithium phosphate, sodium stearate, potassium stearate, and a sodium salt of ethylenediamine tetraacetic acid, among which sodium acetate, potassium acetate, and sodium phosphate are preferably used.

Furthermore, it is preferable that the resin composition (A) contains a phosphorus compound in an amount of about 2 to 200 ppm, more preferably about 3 to 150 ppm, and most preferably about 5 to 100 ppm on the basis of the phosphorus element. A concentration of the phosphorus in the EVOH of less than 2 ppm or more than 200 ppm may cause a problem in the melt moldability or the thermal stability. In particular, such a concentration easily causes the formation of gel-like seeds or coloring problems when subjected to melt-molding over a long period.

The type of the phosphorus compound incorporated into the resin composition (A) is not limited to particular types. A variety of acids such as phosphoric acid and phosphorous acid or salts thereof can be used. The phosphate can be contained in any one of the forms of monobasic phosphate, dibasic phosphate and tribasic phosphate, and the cation thereof is not limited to a particular type, but alkali metal salts and alkaline earth metal salts are preferable. Among these, it is preferable to add the phosphorus compound in the form of sodium dihydrogen phosphate, potassium dihydrogen phosphate, disodium hydrogen phosphate, or dipotassium hydrogen phosphate.

Furthermore, athermal stabilizer, an ultraviolet absorber, an antioxidant, a colorant, a filler or other resins (e.g., polyamide or polyolefin) can be blended to the resin composition (A), as long as the object of the present invention is not impaired.

A blending method to obtain the resin composition (A) used in the present invention as described above is not limited to a particular method. For example, two or more EVOH pellets can be subjected to dry blending, and then the blend can be subjected to melt molding without other processes before the melt molding. More preferably, the blend can be kneaded with a banbury mixer, a uniaxial or biaxial screw extruder or the like so as to be formed into pellets, and then subjected to melt molding. In order to obtain a uniformly dispersed composition and to prevent the formation or contamination of gels or seeds, it is desirable to use an extruder having a high kneadability in the kneading and pellet-forming processes, to seal the hopper port with nitrogen and to perform extrusion at a low temperature.

The multilayered film of the present invention is obtained by stretching a multilayered structure where a resin composition (A) layer and a polypropylene (C) layer are laminated via an adhesive resin (B) layer.

As the polypropylene (C), isotactic polypropylene or syndiotactic polypropylene can be used. The polypropylene (C) can be homopolymer or can contain a small amount of copolymer. A homopolymer of propylene is preferable, when taking it into consideration that it is used in the form of a laminate with the EVOH and the laminate is stretched.

As the adhesive resin (B), any resin that adheres to the resin composition (A) layer and the polypropylene (C) layer can be used. Polyurethane or polyester-based one-or two-component curable adhesive, or products (e.g., polyolefin resin modified with carboxylic acid) obtained by random-copolymerizing or graft-modifying an olefin polymer or olefin copolymer with unsaturated carboxylic acid or anhydrates thereof (e.g., maleic anhydride) are used preferably.

Among these, it is more preferable to use a polyolefin resin modified with carboxylic acid as the adhesive resin (B) in view of the adhesion with the resin composition (A) layer and the polypropylene (C) layer. Examples of the polyolefin resin modified with carboxylic acid include products obtained by reacting polyethylene {low density polyethylene (LDPE), linear low density polyethylene (LLDPE), and very low density polyethylene (VLDPE)}, polypropylene, copolymerized polypropylene, an ethylene-vinyl acetate copolymer, or an ethylene-(meth)acrylic ester (methyl ester or ethyl ester) copolymer with carboxylic acid or anhydrates thereof. Among these, polypropylene modified with carboxylic acid is preferable because of it's good adhesion with the polypropylene (C) layer. In addition, products modified with maleic anhydride are used preferably.

Specific layer structures of the multilayered structure are, for example, A/B/C, C/B/A/B/C, or C/B/A/B/C/B/A/B/C, where A represents the resin composition (A), B represents the adhesive resin (B) layer, and C represents the polypropylene (C) layer. The addition of layers other than these, where appropriate, causes no problems, and the present invention is not limited to the above layer structures. In the case where other thermoplastic resin layers are to be provided on both outermost layers, the layers can be of different types or the same types. Furthermore, a recycled resin layer formed of scraps such as trims that are generated during molding can be provided separately, or the recycled resin layer can be blended to the thermoplastic resin layer. Among these layer structures, the symmetric structures that have the resin composition (A) as the middle layer, such as C/B/A/B/C, are preferable, because the obtained films have a small level of curling, and the handling is easy in subsequent processes when some content is thermally filled therein or printing is performed thereon. Moreover, this structure, where the polypropylene (C) layers that can be stretched in a high stretch ratio sandwich the resin composition (A), is preferable, because apossible stretch ratio of the resin composition (A) can be raised. The layer structure that has the resin composition (A) as the outermost layer, such as A/B/C, is preferable when printing is performed on the multilayered film, because it is possible to perform printing directly on the EVOH which exhibits better printing properties.

The thickness design of the multilayered structure before stretching is not limited to a particular value, but the ratio of the thickness of the resin composition (A) layer with respect to the thickness of the multilayered structure is preferably about 2 to 20%, in view of the moldability and the cost. More specifically, the thickness of the multilayered structure is preferably about 500 to 2000 $\mu$m, and the thickness of the resin composition (A) layer is preferably about 10 to 400 $\mu$m.

As a method for producing the multilayered structure before stretching, dry lamination, extrusion coating, co-extrusion molding or other methods that are usually used by those skilled in the art can be used. Among these methods, a preferable method is a co-extrusion molding method comprising melting resins in an extruder, extruding the melt to form multiple layers simultaneously with a round die or T die, and performing cooling, because the process can be simplified and the production cost can be reduced.

The thus obtained multilayered structure is stretched at least in one direction to a size about 7 to 12 times larger. Such a high stretch ratio is used to orient the polypropylene layer sufficiently so that the film can be provided with sufficient mechanical strength for practical use. In order words, when the stretch ratio is less than 1:7, the strength of the film is insufficient. On the other hand, the multilayered structure cannot be stretched more than about 12 times larger, and is ruptured before that point. The stretch ratio is preferably 1:8 to 1:11.

A preferable stretching temperature of the multilayered structure is about 140 to 200° C. At a temperature of less than 140° C., the polypropylene layer used as the outer layer cannot be stretched sufficiently. At a temperature of more than 200° C., the polypropylene layer is molten so that it cannot be stretched. The temperature is more preferably about 155 to 190° C., and most preferably about 160 to 175° C. The stretching temperature herein refers to the temperature of the atmosphere surrounding the multilayered structure to be stretched.

As the method for stretching the multilayered structure, the methods that are usually used by those skilled in the art for this purpose can be used. For example, firstly, the multilayered structure may be stretched in the longitudinal direction with a longitudinal drawing machine including several rolls having different speeds, and then stretched in the transverse direction with a tenter type drawing machine. On the other hand, firstly, it may be stretched in the transverse direction and then in the longitudinal direction.

Alternatively, a simultaneous biaxial stretching method using a tenter type drawing machine where the gaps between the clips are widened gradually. The stretched multilayered film may be subjected to a heat treatment at a temperature in the vicinity of the stretching temperature after stretching.

The thickness design of the stretched multilayered film is not limited to particular values, but it is preferable that the thickness of the entire film is about 10 to 100 μm, and the thickness of the resin composition (A) is about 1 to 10 μm.

Film having an entire thickness of less than 10 μm is too thin to maintain sufficient strength, especially when it is used to package some contents. On the other hand, film having a thickness of more than 100 μm is too hard, so that contents cannot be packaged well. The thickness of the multilayered film is preferably about 20 to 50 μm.

On the other hand, in the case where the thickness of the resin composition (A) is 1um or less, small holes (pinholes) are formed easily, especially when the film is used for packaging. However, since the resin composition (A) is expensive, a small thickness is preferable to make inexpensive products commercially available. Furthermore, since the resin composition (A) is harder than the polypropylene (C) layer used for the other layers, the thickness of the resin composition (A) of 10 μm or more makes it difficult to use the film for packaging. The thickness of the resin composition (A) is more preferably 3 μm to 8 μm.

Furthermore, it is more preferable that the ratio of the thickness of the resin composition (A) layer to the total thickness of the multilayered film of the present invention is about 3 to 30%, the ratio of the thickness of the adhesive resin (B) layer thereto is about 1 to 30%, the ratio of the thickness of the polypropylene (C) layer thereto is about 40 to 96%, and the dynamic modulus of elasticity (E') of the multilayered film at 170° C. in dynamic viscoelasticity measurement (under a load of 11 Hz sine wave) is $3 \times 10^7$ dyn/cm$^2$ or more.

The dynamic modulus of elasticity (E') indicates a modulus of elasticity of the stretched film under high temperature. More specifically, it is believed that as a result of sufficient oriented crystallization of the EVOH in the resin composition (A) by stretching, the multilayered film including the resin composition (A) exhibits a high modulus of elasticity under high temperature. It is presumed that the high modulus of elasticity under high temperature results from the fact that the crystals of EVOH in the stretched film have a crystal structure in such a high level that the crystal can retain the structure even at high temperatures. It is believed that such a high level of crystal structure permits high gas barrier properties even at high temperatures. In order words, as E' is higher, the crystallization of the resin composition (A) in the multilayered film is effected sufficiently by orientation by stretching, so that the film can exhibit high gas barrier properties.

When the dynamic modulus of elasticity E' is less than about $3 \times 10^7$ dyn/cm$^2$, the gas barrier properties are poor. The dynamic modulus of elasticity E' is preferably about $4 \times 10^7$ dyn/cm$^2$ or more, more preferably about $5 \times 10^7$ dyn/cm$^2$ or more. In this case, the multilayered film can be measured either in the longitudinal direction or the transverse direction, as long as the direction is parallel to either one of the stretching directions. More specifically, for a biaxially stretched film, it is sufficient to achieve the above-described value for E' in either one of the longitudinal direction or the transverse direction. For a uniaxially stretched film, it is necessary to achieve the above-described value for E' in the stretching direction. Generally, E' is about $1 \times 10^{10}$ dyn/cm$^2$ or less.

As shown in Comparative Example 1, when one EVOH having an excessively low ethylene content (38 mol %) is used, the stretchability deteriorates significantly, and the film is ruptured when subjected to stretching in a high stretch ratio. Therefore, in such a case, E' is not measured.

Furthermore, it is desirable that the ratio of the thickness of the resin composition (A) layer to the thickness of the multilayered film is about 3 to 30%, the thickness ratio of the adhesive resin (B) layer is about 1 to 30%, and the thickness ratio of the polypropylene (C) layer is about 40 to 96%, in view of the strength and the stiffness of the film, the cost or the like. However, it is important to achieve the above-described value for E' in such thickness ratios. The thickness ratio of the resin composition (A) layer is preferably about 5 to 28%, and more preferably about 10 to 25%. The thickness ratio of the adhesive resin (B) layer is preferably about 5 to 20%. The thickness ratio of the polypropylene (C) layer is preferably about 55 to 80%. In the case where the multilayered film includes a plurality of (A) layers, a plurality of (B) layers and a plurality of (C) layers, the thickness of each type of layer is represented by the total thickness of all the layers of each type.

Hereinafter, two preferable methods for producing the multilayered film of the present invention will be described.

The first method for producing the multilayered film comprises co-extruding the resin composition (A) layer, the polypropylene (C) layer and the adhesive resin (B) layer simultaneously to form a multilayered structure, and then biaxially stretching the multilayered structure to about 4 to 7 times larger in the longitudinal direction and about 7 to 12 times larger in the transverse direction. This method simplifies the processes because the multilayered sheet can be stretched without any other processes after the extrusion. Furthermore, in particular, since the resin composition (A) is stretched biaxially in a high stretch ratio, this method is preferable in that the barrier properties can be improved by orientation by stretching. Furthermore, in the case of the structure where the resin composition (A) layer is sandwiched by the polypropylene (C) layers, the outermost layers can be stretched in the same stretch ratio. Therefore, this method is preferable in view of the prevention of curling.

A second method for producing the multilayered film comprises extrusion-coating the resin composition (A) layer and, if necessary, the adhesive resin (B) layer on the polypropylene (C) layer that has been stretched to about 4 to 7 times larger in the longitudinal direction to form a multilayered structure, and biaxially stretching the multilayered structure to about 7 to 12 times larger in the transverse direction. In this method, the resin composition (A), which is the most difficult part to be stretched in the multilayered sheet, is stretched only in one direction. Therefore, this method is preferable in that a resin composition (A) having a higher melting point than that of the resin composition (A) used for biaxial stretching can be used.

The thus-obtained multilayered film has excellent mechanical strength and gas barrier properties so that the film can be used widely in the packaging field that requires oxygen barrier properties. In particular, since the multilayered film of the present invention does not generate toxic gas when it is burned, it is usable in a wide range of uses.

EXAMPLES

Hereinafter, the present invention will be described more specifically. However, the present invention is not limited to the examples below.

The various tests of the present invention were performed according to the following methods.

(I) Melting point, Melting Start Temperature and Melting end Temperature:

The melting point, the melting start temperature and the melting end temperature were measured with a differential scanning calorimeter (DSC), RDC220/SSC5200H type manufactured by Seiko Instruments Inc., according to JIS K7121. Indium and lead were used to calibrate the temperatures.

The melting points, the melting start temperatures and the melting end temperatures of the EVOH resins and the resin composition (A) used in the examples are shown in Table 1 below.

(II) Method for Measuring the Dynamic Modulus of Elasticity (E')

The multilayered film obtained in the present invention (a thickness of 25 μm; a stretch ratio of 1×1:5×10 or 1×10) was cut in 5 mm×35 mm pieces in such a manner that the axial direction in which the film was stretched to 10 times larger became the long side, and the segment was used as a sample. The dynamic modulus of elasticity (E') of this multilayered film was measured in the temperature range of ×50° C. to 200° C. with a dynamic viscoelasticity measurement apparatus ("FT rheospectrer" manufactured by Rheology Co., Ltd.) (frequency: 11 Hz; measurement: tension measurement; amplitude: 10 μm (sine wave); load; automatic static load, temperature increase rate: 3° C./min.) In this measurement, only the multilayered films that had been stretched in a stretch ratio of 1×1:5×10 or 1×10 were used, and the films that were unable to be stretched were not measured.

(III) Method for Evaluating the Multilayered Film (III-1) Stretchability (in the case of simultaneous co-extrusion molding)

First, a multilayered sheet of a polypropylene (C) layer/an adhesive resin (B) layer/a resin composition (A) layer/an adhesive layer (B) layer/a polypropylene (C) layer was prepared. Then, the multilayered sheet was preheated by hot air for 1 minute, and then stretched to 3.5 to 5 times larger in the longitudinal direction at 110° C. Then, the sheet was stretched to 7 to 10 times larger in the transverse direction at 160° C. While stretching the sheet, whether or not the sheet was stretched without being broken was observed. More specifically, the samples of each type were stretched in stretch ratios of 1×1:3.5×7, 4×8, 4.5×9 and 5×10, and evaluated with the following 3 grade criteria:

○: Stretching was successful without breaking the EVOH layer.

Δ: The EVOH layer was broken in some cases.

X : The EVOH layer was broken.

(III-2) Stretchability (in the case of extrusion coating)

An unstretched propylene (C) sheet was stretched to 5 times larger in the longitudinal direction, and then a resin composition (A) layer and an adhesive resin (B) layer were co-extruded and coated on the polypropylene (C) layer so that the adhesive resin (B) layer was in contact with the polypropylene (C) layer. The thus-obtained sheet was preheated by hot air for 1 minute, and then stretched to 8 to 11 times larger in the transverse direction at 160° C. While stretching the sheet, it was observed whether or not the sheet was stretched without being broken. More specifically, the samples of each type were stretched in stretch ratios of 1:8, 9, 10 and 11, and evaluated with the following 3 grade criteria:

○: Stretching was successful without breaking the EVOH layer.

Δ: The EVOH layer was broken in some cases.

X : The EVOH layer was broken.

(III-3) Appearance of the Film

The transparency of the stretched film was evaluated. In the case of the evaluation of the stretched films of the C/B/A/B/C structure, the films that had been stretched in a stretch ratio of 1×1:5×10 were used as samples. In the case of the stretched films of the C/B/A structure, the films that had been stretched in a stretch ratio of 1:11 were used as samples. The appearance of the films were evaluated with the following 4 grade criteria:

◎: Good transparency

○: Haze to some extent

Δ: Creases in the resin composition (A) layer

X : Rupture in the resin composition (A) layer (III-4) Oxygen Permeability

The oxygen permeability was measured with an oxygen permeation measurement apparatus, MOCON OX-TRAN2/20 manufactured by Modern Controls Inc. under the conditions of 20° C. and 85%RH according to the method described in JIS K7126 (equal pressure method). In the case of the evaluation of the stretched films of the C/B/A/B/C structure, the films that had been stretched in a stretch ratio of 1×1:5×10 were used as samples. In the case of the stretched films of the C/B/A structure, the films that had been stretched in a stretch ratio of 1:11 were used as samples.

"Oxygen permeability" in the present invention refers to values obtained by converting the oxygen permeation amount (ml/m$^2$ •day •atm) measured at an arbitrary thickness of the EVOH film to the oxygen permeation amount (ml•20 μm/m$^2$•day•atm) measured at a thickness of 20 μm of the EVOH layer with respect to the films having the C/B/A/B/C structure or the C/B/A structure.

(III-5) Curling Tendency

The stretched films having the C/B/A/B/C structure and the stretched films having the C/B/A structure were allowed to stand in an atmosphere at 20° C. and 65% RH for 5 days after stretching, and how much the films were curled was observed. In the case of the evaluation of the stretched films of the C/B/A/B/C structure, the films that had been stretched in a stretch ratio of 1×1:5 ×10 were used as samples. In the case of the stretched films of the C/B/A structure, the films that had been stretched in a stretch ratio of 1:11 were used as samples. The curling tendency of the films was evaluated with the following 4 grade criteria:

◎: no curling

○: slight curling at the end portion of the film Δ: substantial: one roll of curling at the end portion of the film X : significant curling (III-6) Printability The difference in the printability was observed with the stretched films having the C/B/A/B/C structure and the stretched films having the C/B/A structure. In the case of the evaluation of the stretched films of the C/B/A/B/C structure, the films that had been stretched in a stretch ratio of 1×1:5×10 were used as samples. In the case of the stretched films of the C/B/A structure, the films that had been stretched in a stretch ratio of 1:11 were used as samples. The printability of the films were evaluated with the following 2 grade criteria:

◎: Letters were printed clearly without bluring

: Printing was possible with some repelling

Example 1

Preparation and evaluation of a blend of an EVOH having an ethylene content of 38 mol % and an EVOH having an ethylene content of 44 mol % (in the case of simultaneous co-extrusion molding)

The following two EVOHs (a1) and (a2) were dry-blended in an amount of 50 parts by weight each, and the blend was melted and extruded with a screw having a Madoc type kneading section with a diameter of 40 mm, L/D=24, and a compression ratio of 3.8 to form pellets of the resin composition (A). The results of the DSC measurement of the obtained pellets were that MS (melting start temperature)=137° C. and ME (melting end temperature )=190° C.

EVOH (a1)

Ethylene content: 38 mol %; Saponification degree: 99.6%; MFR=3.8 g/10 minutes (210° C., a load of 2160 g); MP (a1)=175° C.; MS (a1)=140° C.; and ME (a1)=190° C.

A phosphor compound (potassium dihydrogen phosphate) is contained in an amount on the basis of the phosphor element of 100 ppm, and a sodium salt (sodium acetate) is contained in an amount on the basis of the sodium element of 50 ppm.

EVOH (a2)

Ethylene content: 44 mol %; Saponification degree: 99.5%; MFR=13 g/10 minutes (210° C., a load of 2160 g); MP (a2)=168° C.; MS (a2)=137° C.; and ME (a2)=180° C.

A phosphor compound (potassium dihydrogen phosphate) is contained in an amount on the basis of the phosphor element of 65 ppm, and a sodium salt (sodium acetate) is contained in an amount on the basis of the sodium element of 20 ppm.

The above-described resin composition (A), polypropylene (C) and a polypropylene resin modified with maleic anhydride (B) were fed into separate extruders, and a 1250 μm multilayered sheet having a structure of C/B/A/B/C (film thickness: 450 μm/50 μm/250 μm/50 μm/450 μm) was obtained by using a coextrusion sheet forming apparatus for five layers of three types. The polypropylene (C) was extruded at a temperature of 200 to 240° C. by an extruder having a uniaxial screw with a diameter of 65 mm and L/D=22. The polypropylene resin modified with maleic anhydride (B) was extruded at a temperature of 175 to 220° C. by an extruder having a uniaxial screw with a diameter of 40 mm and L/D=26. The resin composition (A) was extruded at a temperature of 190 to 240° C. by an extruder having a uniaxial screw with a diameter of 40 mm and L/D=22. A feed block type die (with a width of 600 mm) was operated at 240° C. When the extrusion molding was performed continuously for 6 hours under the above-described conditions to form the multilayered films, no thermally degraded matter, due to the degradation of the EVOHs, was attached to the die lip portion, and no thermally degraded matter of the EVoHs was observed in the obtained multilayered sheet.

This multilayered sheet was cut into 10×10 cm segments, and evaluated regarding the evaluation items described above. Table 2 shows the results.

Example 2

Preparation and evaluation of a blend of an EVOH having an ethylene content of 38 mol % and an EVOH having an ethylene content of 48 mol % (in the case of simultaneous co-extrusion molding)

The following two EVOHs (a1) and (a2) were dry-blended in an amount of 50 parts by weight each, and the blend was melted and extruded with a screw having a Madoc type kneading section with a diameter of 40 mm, L/D=24, and a compression ratio of 3.8 to form pellets of the resin composition (A). The results of the DSC measurement of the obtained pellets were that MS (melting start temperature)= 128° C. and ME (melting end temperature)=190° C.

EVOH (a1)

Ethylene content: 38 mol %; Saponification degree: 99.6%; MFR=3.8 g/10 minutes (210° C., a load of 2160 g)d; MP (a1)=175° C.; MS (a1)=1372° C.; and ME (a1)=190° C.

A phosphor compound (potassium dihydrogen phosphate) is contained in an amount on the basis of the phosphor element of 100 ppm, and a sodium salt (sodium acetate) is contained in an amount on the basis of the sodium element of 50 ppm.

EVOH (a2)

Ethylene content: 48 mol %; Saponification degree: 99.6%; MFR=33 g/10 minutes (210° C., a load of 2160 g); MP (a2)=160° C.; MS (a2)=127° C.; and ME (a2)=174° C.

A phosphor compound (potassium dihydrogen phosphate) is contained in an amount on the basis of the phosphor element of 50 ppm.

The above-described resin composition (A), polypropylene (C) and a polypropylene resin modified with maleic anhydride (B) were laminated in the same manner as in Example 1, and the obtained multilayered film was evaluated. Table 2 shows the results.

Example 3

Preparation and evaluation of a blend of an EVOH having an ethylene content of 38 mol %, an EVOH having an ethylene content of 44 mol % and an EVOH having an ethylene content of 48 mol % (in the case of simultaneous co-extrusion molding)

The following three resins of EVOHs (a1), (a2) and (a3) were dry-blended in amounts of 45 parts by weight, 45 parts by weight and 10 parts by weight, respectively, and the blend was melted and extruded with a screw having a Madoc type kneading section with a diameter of 40 mm, L/D=24, and a compression ratio of 3.8 to form pellets of the resin composition (A). The results of the DSC measurement of the obtained pellets were that MS (melting start temperature)= 132° C. and ME (melting end temperature)=185° C.

EVOH (a1)

Ethylene content: 38 mol %; Saponification degree: 99.6%; MFR=3.8 g/10 minutes (210° C., a load of 2160 g); MP (a1)=175° C.; MS (a1)=137° C.; and ME (a1)=190° C.

A phosphor compound (potassium dihydrogen phosphate) is contained in an amount on the basis of the phosphor element of 100 ppm, and a sodium salt (sodium acetate) is contained in an amount on the basis of the sodium element of 50 ppm.

EVOH (a2)

Ethylene content: 48 mol %; Saponification degree: 99.6%; MFR=33 g/10 minutes (210° C., a load of 2160 g); MP (a2)=160° C.; MS (a2)=127° C.; and ME (a2)=174° C.

A phosphor compound (potassium dihydrogen phosphate) is contained in an amount on the basis of the phosphor element of 100 ppm, and a sodium salt (sodium acetate) is contained in an amount on the basis of the sodium element of 65 ppm.

EVOH (a3)

Ethylene content: 44 mol %; Saponification degree: 99.5%; MFR=13 g/10 minutes (210° C., a load of 2160 g); MP (a3)=168° C.; MS (a3)=137° C.; and ME (a3)=180° C.

A phosphor compound (potassium dihydrogen phosphate) is contained in an amount on the basis of the phosphor element of 65 ppm, and a sodium salt (sodium acetate) is contained in an amount on the basis of the sodium element of 20 ppm.

The above-described resin composition (A), polypropylene (C) and a polypropylene resin modified with maleic anhydride (B) were laminated in the same manner as in Example 1, and the obtained multilayered film was evaluated. Table 2 shows the results.

Example 4
Preparation and evaluation of a blend of an EVOH having an ethylene content of 38 mol % and an EVOH having an ethylene content of 44 mol % and a saponification degree of 97% (in the case of simultaneous co-extrusion molding)

The following two EVOHs (a1) and (a2) were dry-blended in an amount of 50 parts by weight each, and the blend was melted and extruded with a screw having a Madoc type kneading section with a diameter of 40 mm, L/D=24, and a compression ratio of 3.8 to form pellets of the resin composition (A). The results of the DSC measurement of the obtained pellets were that MS (melting start temperature)=132° C. and ME (melting end temperature)=190° C.

EVOH (a1)
Ethylene content: 38 mol %; Saponification degree: 99.6%; MFR=3.8 g/10 minutes (210° C., a load of 2160g); MP (a1)=175° C.; MS (a1)=137° C.; and ME (a1)=190° C.

A phosphor compound (potassium dihydrogen phosphate) is contained in an amount on the basis of the phosphor element of 100 ppm, and a sodium salt (sodium acetate) is contained in an amount on the basis of the sodium element of 50 ppm.

EVOH (a2)
Ethylene content: 44 mol %; Saponification degree: 97.1%; MFR=5.1 g/10 minutes (190° C., a load of 2160 g); MP (a2)=165° C.; MS (a2)=132° C.; and ME (a2)=176° C.

A phosphor compound (potassium dihydrogen phosphate) is contained in an amount on the basis of the phosphor element of 50 ppm, and a sodium salt (sodium acetate) is contained in an amount on the basis of the sodium element of 50 ppm.

The above-described resin composition (A), polypropylene (C) and a polypropylene resin modified with maleic anhydride (B) were laminated in the same manner as in Example 1, and the obtained multilayered film was evaluated. When the extrusion molding was performed continuously for 6 hours to form the multilayered films in the same manner as in Example 1, thermally degraded matters, due to the degradation of the EVOHs, were attached to the die lip portion, and foreign matters that were apparently caused by the thermally degraded matters were observed in the obtained multilayered sheet. Table 2 shows the results.

Example 5
Preparation and evaluation of a blend of an EVOH having an ethylene content of 38 mol % and an EVOH having an ethylene content of 44 mol % (in the case of extrusion coating)

An unstretched polypropylene (C) sheet having a thickness of 900 μm was stretched to 5 times larger in the longitudinal direction. Then, the resin composition (A) used in Example 1 and a polypropylene resin modified with maleic anhydride (B) were fed into separate extruders, and a melt laminate having a structure of (A)/(B) (a thickness of 50 μm /20 μm) was coated by coextrusion on the polypropylene (C) sheet so that the adhesive resin (B) layer was in contact with the polypropylene (C) sheet. The co-extrusion of the resin composition (A) and the polypropylene resin modified with maleic anhydride (B) was performed under the following conditions. The resin composition (A) was extruded at a temperature of 190° C. to 240° C. by an extruder having a uniaxial screw with a diameter of 40 mm and L/D=22. The polypropylene resin modified with maleic anhydride (B) was extruded at a temperature of 175° C. to 220° C. by an extruder having a uniaxial s crew with a diameter of 40 mm and L/D=i26. A feed block type die (with a width of 600 mm) was operated at 240° C. Thus, a multilayered sheet was obtained.

This multilayered sheet was cut in sections of 10×10 cm, and evaluated regarding the evaluation item s described above. Table 3 shows the results.

Example 6
Preparation and evaluation of a blend of an EVOH having an ethylene content of 38 mol % and an EVOH having an ethylene content of 48 mol % (in the case of extrusion coating)

The resin composition (A) used in Example 2 was used, and the obtained multilayered film was evaluated in the same manner as in Example 5. Table 3 shows the results.

Example 7
Preparation and evaluation of a blend of an EVOH having an ethylene content of 38 mol %, an EVOH having an ethylene content of 44 mol % and an EVOH having an ethylene content of 48 mol % (in the case of extrusion coating)

The resin composition (A) used in Example 3 was used, and the obtained multilayered film was evaluated in the same manner as in Example 5. Table 3 shows the results.

Example 8
Preparation and evaluation of a blend of an EVOH having an ethylene content of 38 mol % and an EVOH having an ethylene content of 44 mol % and a saponification degree of 97% (in the case of extrusion coating)

The resin composition (A) used in Example 4 was used, and the obtained multilayered film was evaluated in the same manner as in Example 5. Table 3 shows the results.

Comparative Example 1

The multilayered film was prepared in the same manner as in Example 1 except that an EVOH having an ethylene content of 38 mol % was used instead of the resin composition (A), and evaluated in the same manner as in Example 1. Table 2 shows the results. The same EVOH as the EVOH (a1) used in Example 1 was used as the EVOH having an ethylene content of 38 mol %.

Comparative Example 2

The multilayered film was prepared in the same manner as in Example 1 except that an EVOH having an ethylene content of 44 mol % was used instead of the resin composition (A), and evaluated in the same manner as in Example 1. Table 2 shows the results. The same EVOH as the EVOH (a2) used in Example 1 was used as the EVOH having an ethylene content of 44 mol %.

Comparative Example 3

The multilayered film was prepared in the same manner as in Example 1 except that an EVOH having an ethylene content of 48 mol % was used instead of the resin composition (A), and evaluated in the same manner as in Example 1. Table 2 shows the results. The same EVOH as the EVOH (a2) used in Example 2 was used as the EVOH having an ethylene content of 48 mol %.

Comparative Example 4

The multilayered film was prepared in the same manner as in Example 5 except that an EVOH having an ethylene content of 38 mol % was used instead of the resin composition (A), and evaluated in the same manner as in Example 5. Table 3 shows the results. The same EVOH as the EVOH (a1) used in Example 1 was used as the EVOH having an ethylene content of 38 mol %.

Comparative Example 5

The multilayered film was prepared in the same manner as in Example 5 except that an EVOH having an ethylene content of 44 mol % was used instead of the resin composition (A), and evaluated in the same manner as in Example 5. Table 3 shows the results. The same EVOH as the EVOH (a2) used in Example 1 was used as the EVOH having an ethylene content of 44 mol %.

Comparative Example 6

The multilayered film was prepared in the same manner as in Example 5 except that an EVOH having an ethylene content of 48 mol % was used instead of the resin composition (A), and evaluated in the same manner as in Example 5. Table 3 shows the results. The same EVOH as the EVOH (a2) used in Example 2 was used as the EVOH having an ethylene content of 48 mol %.

TABLE 1

Melting point, Melting start temperature and Melting end temperature

| Resin Composition*1 | Melting start temperature (° C.) | Melting end temperature (° C.) | Melting point (° C.) |
|---|---|---|---|
| H/E = 50/50 | 137 | 191 | — |
| H/G = 50/50 | 128 | 191 | — |
| H/G/E = 45/45/10 | 132 | 185 | — |
| H/EP = 50/50 | 132 | 190 | — |
| H | 140 | 190 | 178 |
| E | 135 | 184 | 169 |
| G | 127 | 176 | 160 |

Note: *1 H: EVOH having an ethylene content of 38 mol %
E: EVOH having an ethylene content of 44 mol %
EP: EVOH having an ethylene content of 44 mol % and a saponification degree of 97.1%
G: EVOH having an ethylene content of 48 mol %

TABLE 2

In the case of simultaneous co-extrusion molding (C/B/A/B/C structure)

| | Resin composition*1 | Stretchability 3.5 × 7 | 4 × 8 | 4.5 × 9 | 5 × 10 | Appearance of film | Dynamic modulus of elasticity (E') (dyn/cm$^2$) | Oxygen permeation amount*2 | Curling tendency | Printability |
|---|---|---|---|---|---|---|---|---|---|---|
| Ex. 1 | H/E = 50/50 | ○ | ○ | ○ | Δ | Δ | 2.00E+08 | 1.5 | ⊙ | ○ |
| Ex. 2 | H/G = 50/50 | ○ | ○ | ○ | ○ | ○ | 6.00E+07 | 2.5 | ⊙ | ○ |
| Ex. 3 | H/G/E = 45/45/10 | ○ | ○ | ○ | ○ | ⊙ | 9.00E+07 | 2 | ⊙ | ○ |
| Ex. 4 | H/EP = 50/50 | ○ | ○ | ○ | ○ | ○ | 5.00E+07 | 2.9 | ⊙ | ○ |
| Com. Ex. 1 | H | × | × | × | × | × | — | — | ⊙ | ○ |
| Com. Ex. 2 | E | ○ | ○ | ○ | Δ | Δ | 8.00E+06 | 4.5 | ⊙ | ○ |
| Com. Ex. 3 | G | ○ | ○ | ○ | ○ | ⊙ | 6.00E+06 | 7 | ⊙ | ○ |

Note:
*1 H: EVOH having an ethylene content of 38 mol %
E: EVOH having an ethylene content of 44 mol %
EP: EVOH having an ethylene content of 44 mol % and a saponification degree of 97.1%
G: EVOH having an ethylene content of 48 mol %
*2 Measurement conditions: 20° C., 85% RH, 2 weeks for humidity conditioning
Unit: cc · 20 μm/m$^2$ · day · atm

TABLE 3

In the case of extrusion coating (A/B/C structure)

| | Resin composition*1 | Stretchability 8 | 9 | 10 | 11 | Appearance of film | Dynamic modulus of elasticity (E') (dyn/cm$^2$) | Oxygen permeation amount*2 | Curling tendency | Printability |
|---|---|---|---|---|---|---|---|---|---|---|
| Ex. 5 | H/E = 50/50 | ○ | ○ | ○ | Δ | Δ | 1.00E+08 | 3.2 | Δ | ⊙ |
| Ex. 6 | H/G = 50/50 | ○ | ○ | ○ | ○ | ○ | 5.00E+07 | 5.5 | Δ | ⊙ |
| Ex. 7 | H/G/E = 45/45/10 | ○ | ○ | ○ | ○ | ⊙ | 8.00E+07 | 4.3 | Δ | ⊙ |
| Ex. 8 | H/EP = 50/50 | ○ | ○ | ○ | ○ | ○ | 4.00E+07 | 6.2 | Δ | ⊙ |
| Com. Ex. 4 | H | Δ | × | × | × | × | — | — | × | ⊙ |
| Com. Ex. 5 | E | ○ | ○ | ○ | Δ | Δ | 9.00E+06 | 11 | × | ⊙ |
| Com. Ex. 6 | G | ○ | ○ | ○ | ○ | ⊙ | 5.00E+06 | 20 | Δ | ⊙ |

Note:
*1 H: EVOH having an ethylene content of 38 mol %
E: EVOH having an ethylene content of 44 mol %
EP: EVOH having an ethylene content of 44 mol % and a saponification degree of 97.1%
G: EVOH having an ethylene content of 48 mol %
*2 Measurement conditions: 20° C., 85% RH, 2 weeks for humidity conditioning
Unit: cc · 20 μm/m$^2$ · day · atm In the above examples, for example, Example 2 is a stretched film obtained by using a blend of EVOHs having ethylene contents of 38 mol % and 48 mol % in an equal amount (an average ethylene content of 43 mol %), and the E' thereof was $6\times10^7$dyn/cm$^2$. On the other hand, Comparative Example 2 is a stretched film obtained by using a single EVOH having an ethylene content of 44 mol %, and the E' thereof was $8\times10^6$dyn/cm$^2$. Although Example 2 and Comparative Example 2 have substantially the same average ethylene content, the E' of Example 2 is 7 times greater than that of Comparative Example 2, which is surprising. Corresponding to the difference in the E', the oxygen permeation amount was reduced significantly from 4.5 cc•20 μm/m$^2$•day•atm to 2.5 cc•20 μm/m$^2$•day•atm. In addition, the multilayered film of Comparative Example 2 ruptured in the EVOH layer in some cases when being stretched in a stretch ratio of 1×1:5×10, whereas the multilayered film of Example 2 has no rupture in the EVOH layer even when being stretched in a stretch ratio of 1×1:5×10. In other words, the multilayered film of Example 2 has better stretchability and more excellent gas barrier properties. Thus, the usefulness of the multilayered film of the present invention is significantly high.

Furthermore, Example 3 is a stretched film obtained by using a blend of three EVOHs having ethylene contents of 38 mol %, 44 mol % and 48 mol % in a weight ratio of 45:10:45, and the average ethylene content thereof is 43 mol % as in Example 2. However, the E' thereof ($9\times10^7$dyn/cm$^2$) was even greater than that of Example 2, and the oxygen permeation amount thereof (2 cc•20 μm/m$^2$•day•atm) was smaller than that of Example 2. Therefore, in the case where three such EVOHs are blended, the results are even better than in the case where the two EVOHs are blended. Thus, it is far more useful to use three EVOHs.

When Example 1 is compared with Example 4, extrusion molding for a short period allowed a high quality multilayered film to be obtained, whereas a continuous operation for a long period (6 hours) caused slight thermal degradation to the multilayered film in Example 4. It is believed that this is because an EVOH having a low saponification degree (97%) was used in Example 4.

The multilayered structure of the present invention comprising the polypropylene layer and the EVOH layer can be stretched in a high stretch ratio of 7 to 12 times larger at least in one direction, and the obtained stretched film has good gas barrier properties, and has good heat sealing properties after a content is filled therein.

Furthermore, in the case where a symmetric structure such as C/B/A/B/C is adopted for the film structure, curling is hardly caused. In the case where the EVOH layer is provided as the outermost layer in such a film structure as A/B/C, the film has excellent printability after being stretched.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A multilayered film formed by stretching a multilayered structure to 7 to 12 times larger at least in one direction, said multilayered structure being formed by laminating a resin composition (A) layer and a polypropylene (C) layer via an adhesive resin (B) layer, wherein a ratio of a thickness of the resin composition (A) layer to a total thickness of the multilayered film is 3 to 30%, a ratio of a thickness of the adhesive resin (B) layer to a total thickness of the multilayered film is 1 to 30%, a ratio of a thickness of the polypropylene (C) layer to a total thickness of the multilayered film is 40 to 96%, and a dynamic modulus of elasticity (E') of the multilayered film at 170° C. in dynamic viscoelasticity measurement (under a load of 11 Hz sine wave) is $3\times10^7$ dyn/cm$^2$ or more, and wherein the resin composition (A) comprises two ethylene-vinyl alcohol copolymers (a1 and a2) having different melting points and satisfies the following formulae (1) to (3):

$$150 \leq MP\ (a1) \leq 172 \tag{1}$$

$$162 \leq MP\ (a2) \leq 180 \tag{2}$$

$$4 \leq \{MP(a2) - MP\ (a1)\} \leq 30 \tag{3}$$

where MP(a1) represents the melting point (° C.) of the ethylene-vinyl alcohol copolymer (a1) measured by a differential scanning calorimeter (DSC), and MP(a2) represents the melting point (° C.) of the ethylene-vinyl alcohol copolymer (a2) measured by a differential scanning calorimeter (DSC).

2. A multilayered film according to claim 1, wherein the resin composition (A) has an average ethylene content of 38 to 45mol % and an average saponification degree of 90% or more.

3. A multilayered film according to claim 1, wherein the resin composition (A) comprises three ethylene-vinyl alcohol copolymers (a1, a2 and a3) having different melting points and satisfies the following formulae (4) to (6):

$$MP(a1) < MP(a3) < MP(a2) \tag{4}$$

$$3 \leq \{MP(a3) - MP(a1)\} \leq 20 \tag{5}$$

$$3 \leq \{MP(a2) - MP(a3)\} \leq 20 \tag{6}$$

where MP(a1) represents the melting point (° C.) of the ethylene-vinyl alcohol copolymer (a1) measured by a differential scanning calorimeter (DSC), MP (a2) represents the melting point (° C.) of the ethylene-vinyl alcohol copolymer (a2) measured by a differential scanning calorimeter (DSC), and MP(a3) represents the melting point (° C.) of the ethylene-vinyl alcohol copolymer (a3) measured by a differential scanning calorimeter (DSC).

4. A multilayer film according to claim 3, wherein said resin composition (A) satisfies the following formulae (4), (5'), and (6'):

$$MP(a1) < MP(a3) < MP(a2) \tag{4'}$$

$$5 \leq \{MP(a3) - MP(a1)\} \leq 12 \tag{5'}$$

$$5 \leq \{MP(a2) - MP(a3)\} \leq 12 \tag{6'}$$

5. A multilayered film according to claim 1, wherein the adhesive resin (B) is a polyolefin modified with carboxylic acid.

6. A multilayered film according to claim 1, wherein the total thickness of the multilayered film is 10 to 100 μm, and the thickness of the resin composition (A) layer is 1 to 10 μm.

7. A multilayered film according to claim 1, which is formed by stretching the multilayered structure at 140 to 200° C.

8. A multilayered film according to claim 1, which is formed by: co-extruding the resin composition (A) layer, the polypropylene (C) layer and the adhesive resin (B) layer simultaneously to form a multilayered structure, and biaxially stretching the multilayered structure to 4 to 7 times larger in a longitudinal direction and 7 to 12 times larger in a transverse direction.

9. A multilayered film according to claim 1, which is formed by: co-extruding the resin composition (A) and the adhesive composition(B) simultaneously on the polypropylene (C) layer that has been stretched to 4 to 7 times larger in a longitudinal direction to form a multilayered structure, and biaxially stretching the multilayered structure to 7 to 12 times larger in a transverse direction.

10. A multilayered film according to claim 1, wherein the adhesive resin (B) is polypropylene modified with carboxylic acid.

11. A multilayered film according to claim 1, wherein the resin composition (A) has an average ethylene content of 40 to 44 mol % and an average saponification degree of 99% or more.

12. A multilayered film according to claim 1, wherein said resin composition (A) satisfies the following formulae (1') to (3'):

$$155 \leq MP(a1) \leq 170 \qquad (1')$$

$$165 \leq MP(a2) \leq 180 \qquad (2')$$

$$7 \leq \{MP(a2)-MP(a1)\} \leq 20 \qquad (3').$$

13. A multilayered film according to claim 1, wherein the total thickness of the multilayered film is 20 to 50 μm, and the thickness of the resin composition (A) layer is 3 to 8 μm.

14. A multilayered film according to claim 1, which is formed by stretching the multilayered structure at 160 to 175° C.

15. A multilayered film according to claim 1, wherein the multilayered structure is selected from the group consisting of A/B/C, C/B/A/B/C and C/B/A/B/C/B/A/B/C.

16. A multilayered film formed by stretching a multilayered structure to 7 to 12 times larger at least in one direction, said multilayered structure being formed by laminating a resin composition (A) layer and a polypropylene (C) layer via an adhesive resin (B) layer, wherein a ratio of a thickness of the resin composition (A) layer to a total thickness of the multilayered film is 3 to 30%, a ratio of a thickness of the adhesive resin (B) layer to a total thickness of the multilayered film is 1 to 30%, a ratio of a thickness of the polypropylene (C) layer to a total thickness of the multilayered film is 40 to 96%, and a dynamic modulus of elasticity (E') of the multilayered film at 170° C. in dynamic viscoelasticity measurement (under a load of 11 Hz sine wave) is $3 \times 10^7$ dyn/cm$^2$ or more, and wherein the resin composition (A) comprises an ethylene-vinyl alcohol copolymer and satisfies the following formulae (7) to (9):

$$115 \leq MS \leq 140 \qquad (7)$$

$$180 \leq ME \leq 195 \qquad (8)$$

$$52 \leq (ME-MS) \leq 80 \qquad (9)$$

where MS represents the melting start temperature (° C.) of the resin composition (A) measured by a differential scanning calorimeter (DSC), and ME represents the melting end temperature (° C.) of the resin composition (A) measured by a differential scanning calorimeter (DSC).

17. A multilayered film according to claim 16, wherein said resin composition (A) satisfies the following formulae (7') to (9'):

$$125 \leq MS \leq 138 \qquad (7')$$

$$182 \leq ME \leq 192 \qquad (8')$$

$$52 \leq (ME-MS) \leq 70 \qquad (9').$$

* * * * *

UNITED STATES PATENT AND TRADEMARK OFFICE
CERTIFICATE OF CORRECTION

PATENT NO.    : 6,372,359 B1
DATED         : April 16, 2002
INVENTOR(S)   : Nahoto Hayashi et al.

It is certified that error appears in the above-identified patent and that said Letters Patent is hereby corrected as shown below:

Column 4,
Line 67, "manner; According" should read -- manner: according --.

Column 5,
Line 15, "Apreferable ethylene" should read -- A preferable ethylene --.

Column 7,
Line 34, "preferably" should read -- preferable --.

Column 9,
Line 9, "athermal stabilizer" should read -- a thermal stabilizer --.

Column 10,
Line 15, "apossible stretch" should read -- a possible stretch --.

Column 11,
Line 17, "is lum" should read -- is l$\mu$m --.

Column 13,
Line 21, "X50º C." should read -- -50º C. --.

Column 14,
Line 63, ": Printing" should read -- ○ : Printing --.

Column 15,
Line 49, "EVoHs" should read -- EVOHs --.

Column 17,
Line 65, "L/D=i26" should read -- L/D = 26 --.

UNITED STATES PATENT AND TRADEMARK OFFICE
CERTIFICATE OF CORRECTION

PATENT NO. : 6,372,359 B1
DATED : April 16, 2002
INVENTOR(S) : Nahoto Hayashi et al.

It is certified that error appears in the above-identified patent and that said Letters Patent is hereby corrected as shown below:

<u>Column 18,</u>
Line 2, "item s described" should read -- items described --.

<u>Column 22,</u>
Line 56, "(4')" should read -- (4) --.

Signed and Sealed this

Eighth Day of October, 2002

*Attest:*

*Attesting Officer*

JAMES E. ROGAN
*Director of the United States Patent and Trademark Office*